(12) United States Patent
Ghosh (10) Patent No.: US 6,585,151 B1
(45) Date of Patent: Jul. 1, 2003

(54) METHOD FOR PRODUCING MICROPOROUS OBJECTS WITH FIBER, WIRE OR FOIL CORE AND MICROPOROUS CELLULAR OBJECTS

(75) Inventor: Amit K. Ghosh, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/577,176

(22) Filed: May 23, 2000

(51) Int. Cl.[7] ............................................... B23K 31/02
(52) U.S. Cl. ...................................... 228/260; 164/76.1
(58) Field of Search ................................ 228/260, 256, 228/178, 181, 185, 190; 164/76.1

(56) References Cited

U.S. PATENT DOCUMENTS

| | | | |
|---|---|---|---|
| 2,976,590 A | 3/1961 | Pond | 22/200.1 |
| 3,170,205 A | 2/1965 | Brown | 22/200.1 |
| 3,216,076 A | 11/1965 | Alber et al. | 22/200.1 |
| 3,584,678 A | 6/1971 | Rakestraw | 164/273 |
| 3,613,158 A | 10/1971 | Mottern et al. | 18/8 QM |
| 3,645,657 A | 2/1972 | Ostot et al. | 425/72 |
| 3,658,979 A | 4/1972 | Dunn et al. | 264/176 F |
| 3,685,568 A | 8/1972 | Pond, Sr. | 164/89 |
| 3,692,089 A | 9/1972 | Privott, Jr. et al. | 164/66 |
| 3,713,477 A | 1/1973 | Kuniyasu et al. | 164/69 |
| 3,713,787 A | 1/1973 | Kuniyasu | |
| 3,715,418 A | 2/1973 | Privott, Jr. et al. | 214/82 |
| 3,715,419 A | 2/1973 | Privott, Jr. et al. | 264/82 |
| 3,720,741 A | 3/1973 | Cunningham | |
| 3,750,741 A | 8/1973 | Rakestraw | |
| 3,752,211 A | 8/1973 | Kuniyasu | |
| 3,780,153 A | 12/1973 | Privott, Jr. et al. | 264/176 F |
| 3,853,171 A | 12/1974 | Junker | |
| 3,854,518 A | 12/1974 | Junker | |
| 3,854,519 A | 12/1974 | Junker | |
| 3,861,452 A | 1/1975 | Massoubre | |
| 3,889,348 A * | 6/1975 | Lemelson | 164/108 |
| 3,989,548 A | 11/1976 | Morris | |
| 4,020,891 A | 5/1977 | Adler | |
| 4,209,563 A * | 6/1980 | Sisson | 156/167 |
| 4,362,655 A | 12/1982 | Jenkins | |
| 4,518,661 A * | 5/1985 | Rippere | 174/129 R |
| 4,530,884 A * | 7/1985 | Erickson et al. | 123/193.6 |
| 4,828,932 A * | 5/1989 | Morimoto et al. | 181/292 |
| 4,852,454 A | 8/1989 | Batchelder | |
| 4,899,800 A | 2/1990 | Gallerneault et al. | |
| 4,999,240 A | 3/1991 | Brotz | |
| 5,059,326 A * | 10/1991 | Haerle | 210/491 |
| 5,097,887 A | 3/1992 | Schmid et al. | |
| 5,128,174 A | 7/1992 | Brotz | |
| 5,130,204 A | 7/1992 | Jenkin | |
| 5,188,164 A * | 2/1993 | Kantner et al. | 164/111 |
| 5,326,647 A * | 7/1994 | Merz et al. | 277/415 |
| 5,348,210 A * | 9/1994 | Linzell | 228/115 |
| 5,643,684 A * | 7/1997 | Tsubouchi et al. | 428/397 |
| 5,665,479 A * | 9/1997 | Vandamme et al. | 210/500.25 |
| 5,827,439 A * | 10/1998 | Sato et al. | 164/463 |
| 5,843,365 A | 12/1998 | Pinson et al. | |
| 5,855,828 A * | 1/1999 | Tuffias et al. | 164/122 |
| 5,866,272 A * | 2/1999 | Westre et al. | 244/119 |
| 5,874,133 A | 2/1999 | Cochran | |
| 5,876,659 A | 3/1999 | Yasutomi et al. | |
| 5,981,083 A | 11/1999 | Colvin et al. | |
| 5,983,973 A | 11/1999 | Cornie | |

OTHER PUBLICATIONS

Industrialization of Powder Compact Foaming Process, Baumgartner et al. ,Advanced Eng'rg. Mat'ls, 2000,2, No. 4 p. 168–174.

* cited by examiner

*Primary Examiner*—Tom Dunn
*Assistant Examiner*—Zidia Pittman
(74) *Attorney, Agent, or Firm*—Barbara M. Burns

(57) ABSTRACT

A method for producing microporous objects with fiber, wire or foil core with periodic welding of nodes by movement of the substrate and the making of a porous mat. Microporous objects are created by deposition of small dimension of solid from liquid streams undergoing solidification with the simultaneous welding of the streams at various nodal locations concurrently during the deposition process. Bulk porous material objects are created containing open spaces within the microstructure. Inserts can be added to create internal geometries. Variations in pore density from near-zero to about 95% with gradient densities can be created. Screens can be used for forming column-like supports within the microporous object. Holes can be punched in the fiber core to create desired properties of denser regions and to limit the thermal expansion of the mat in a single direction. The initial heat contact of the liquid metal is used to create the shape of the deposited segments as well as to remelt immediately deposited solid for in-situ welding. No additional heat source is employed to weld and create the network structure.

18 Claims, 10 Drawing Sheets

METHOD FOR PRODUCING MICROPOROUS OBJECTS WITH FIBER, WIRE OR FOIL CORE AND MICROPOROUS CELLULAR OBJECTS

This invention was made in part with government support awarded by the Office of Naval Research (Grant #N00014-97-1-0510). The government has certain rights in the invention.

BACKGROUND OF THE INVENTION

It has been recently noted that the potential for applying metal foams in lightweight construction is mainly based on the increased stiffness of two flat or curved sheets that are separated by a foam layer as compared to a single sheet of the same weight. Attempts have been made in the automotive industry to reduce weight by traditional measures, such as improving steel quality and reducing the thickness of steel sheets or sections, or by creating structures with variable wall thicknesses. Unfortunately, by decreasing wall thickness there is an increased potential for buckling of the structure. By using sandwiches with an aluminum-foam core, it is possible to obtain a higher stiffness and rigidity, maintaining stability against buckling and additionally making the use if the high energy dissipation capability of the foams. A recent highlight of lightweight construction is the use of aluminum-foam sandwiches (AFSs) in space-frame constructions. Karmann, a German car manufacturer, has demonstrated that an increasing structural rigidity for the entire car body can be achieved by using AFSs instead of conventional sheet panels. The use of such AFSs parts combines weight reductions with additional improvements of crash worthiness and also environmental advantages are realized because of the easy recyclability of the material.

Cellular metals can be effectively employed in many applications. Some applications may be for: lightweight structures as low cost replacement for honeycombs, etc.; energy absorbers for crash protection; heat exchanger materials; storage for fuels (e.g. hydrogen) and catalysts; sound dampening materials; thermal insulation, e.g., thermal protection systems: and prosthetic devices. Cell size, shape and geometry requirements vary for each application.

Several approaches are known for producing lightweight porous materials. Most of these approaches utilize foaming methods, i.e., via incorporating additives (or secondary materials) which cause gas evolution within the solid or liquid material. Other approaches rely on incorporating oxides (in the case of metal foams) to pin the boundaries of foam and make them stable so the cell walls do not collapse during processing. Introduction of foreign materials to metallic systems can cause detrimental effects and poor mechanical properties in certain reactive metals, e.g., titanium.

Open cell foams have certain advantages of closed cell foams. Due to open space between supports, fluid can be passed through such material to serve multifunctional needs, e.g. heat transfer applications, storage of fuel or catalyst, thermal protection prosthetic devices, etc.

It is thus necessary to develop methods for making open cell porous materials which do not rely upon the introduction of other contaminating elements. It is also of interests to fabricate porous solids whose unit cell size is approximately 1 mm or smaller (in the micron range) rather than several centimeters as for metal foams. Finer pore sizes leads to higher strength and stiffness in the final product. Moreover, materials containing large pore sizes are more difficult to machine without damaging the surface layers. Smaller pore sizes are superior as cutting often smears and closes surface pores.

Some patents with regard to the above approaches are as follows U.S. Pat. No. 5,112,697 to I. Jin, L. D. Kenny and H. Sang, teaches a method of foaming liquid aluminum to produce closed cell porous metals. U.S. Pat. No. 5,151,246 to J. Baumeister and H. Schrader teaches a powder metallurgy approach to cause foaming in the solid state to produce closed cell foams. U.S. Pat. No. 3,981,720 to S. E. Speed discusses foam structures. German patent DE40 18 360 to J. Baumeister discusses metal foams. U.S. Pat. No. 5,843,365 deals with directed fiber performing apparatus and method having fiber lay-up control. U.S. Pat. Nos. 4,999,240 and 5,128,174 teach metallized fiber/member structures and methods of producing same. U.S. Pat. No. 5,874,133 discusses process for making polyurethane composite. U.S. Pat. No. 5,097,887 shows process of making a pressure diecast fiber reinforced part. U.S. Pat. No. 3,989,548 teaches aluminum alloy products and methods of preparation. U.S. Pat. No. 5,983,973 discloses method for high throughput pressure casting. U.S. Pat. No. 5,981,083 teaches method of making composite castings using reinforcement insert cladding. U.S. Pat. No. 4,899,800 discusses metal matrix composite with coating reinforcing preform. U.S. Pat. No. 5,876,659 shows process for producing fiber reinforced composite. Metal foams are discussed in product information sheets from Cymat Corp. of Canada.

SUMMARY OF THE INVENTION

It is therefore an object of this invention to provide a method for producing microporous objects having a fiber, wire or foil core.

It is also an object of this invention to provide microporous objects having a fiber or foil core.

It is an object of this invention to create microporous objects by heating a material to its liquid state and pressurizing the material and extruding a stream of the liquid and partly solid material through an orifice into a cooler environment and controlling its deposition on to a substrate as a combination of the solid wire (or fiber) as well as liquid portions of the stream which help to weld the wire segments.

It is a further object of this invention to provide such microporous objects having a range of 100% solid to 95% porous in the same process and create either a fixed pore volume or a gradient porosity microstructure in the same part.

It is also a an object of this invention to provide articles by a rapid deposition process, rather than rely on slow and expensive investments casting process to produce intricate interior shapes.

It is a further object of this invention to provide such methods for making porous materials which do not rely upon the introduction of other contaminating elements, eliminate atmospheric contamination by performing the deposition operation in an inert environment.

It is a further object of this invention to fabricate porous solids whose unit cell size is approximately 1 mm or smaller (in the micron range) rather than several centimeters as for metal foams.

It is a further object of this invention to provide such materials having finer pore sizes that yields higher strength and stiffness in the final product.

It is a further object of this invention to provide such method for fabricating materials and the materials having smaller pore sizes to benefit the cutting of the materials.

It is a further object of this invention to create internal geometry of the microporous object by deformation, inserting various shaped inserts and using screening to create microchannels in the object.

The invention deals with the concurrent deposition of liquid undergoing solidification and in-situ welding by remelting of certain nodes of the immediately solidified wire by the newly arriving liquid wire which also solidifies instantaneously upon giving off its latent heat to partly melt the solid wire created in the prior instant. The invention is not about a method which has two separate steps: one of deposition and one of welding. The deposition and the welding are happening concurrently during the same action. An analogy using a building would be if you want to build a building you can first make steel beams and channels by melting, casting, and rolling steel. Then you place these steel joists and beams in proper positions and then you weld the joists together to create the skeletal structure of the building. However, if you could come up with a process by which in a single step the steel channels and beams are created and placed in certain geometric arrangement and are welded together to create the skeletal structure of the building, all occurring concurrently in the same process, that would be an extremely novel and non-obvious process.

The microporous objects are created by deposition of small dimensions of solid from liquid streams undergoing solidification with the simultaneous welding of the streams at various nodal locations concurrently during deposition. The invention is a method for producing microporous objects with fiber, wire or foil core with periodic welding of nodes by the movement of the substrate within a positioned range on the stream between a fully solidified region and a liquid (or semisolid) region, and the making of a welded porous cellular foam or mat. Bulk solids containing open spaces within the microstructure can be built up.

Herein described is a low cost method for building 3-dimensional objects of arbitrary geometries having microporous interior microstructures to produce ultralightweight metallic parts. The interior microstructure of the parts can be fibrous as in natural product, or foil and truss-like as in honeycomb and other artificial products. Due to the microscopic sizes of the internal porous structures both strength and stiffness properties (in density-corrected form) of these materials exceed those of solid or other hollow structures.

The method can produce microstructures in the range of 100% solid to 95% porous in the same process, and create either a constant pore volume or a gradient porosity microstructure in the same part. Due to the flexibility of the liquid metal based process, certain alloy compositions which cannot be shaped into parts by conventional techniques, can be shaped into complex parts by the this deposition method. By controlling the substrate travel speed relative to the liquid extrusion speed, the method allows fabrication of parts having an exterior skin and/or interior laminations of the same alloy or other reinforcement materials for toughening or strengthening.

These materials can be further processed by secondary processing methods such as by rolling, forging, etc. into a variety of shapes as necessary. These porous products do not use external foaming agents and are thus more ductile and tough than existing metal products. Porous metal structures produced by this method can have applications in aerospace structures and engine parts, automotive crush energy absorbers, seat backs and other parts, embedding sensors, sound dampeners, strain isolation layers for systems affected by thermal stresses, etc.

Conventional fabrication technologies traditionally rely on developing and fine tuning a material before beginning to create a shape out of it for useful purposes. In contrast, the process of the invention creates the external shape and the internal microstructure all in a single process via computer aided deposition process. It is worth noting that this process is very different from Rapid Prototyping or fusing of powder particles by laser melting to produce shape. Powder metal is expensive, fine powder contains oxides and other contaminants which degrade the mechanical properties of the articles, and causes health hazard. Thus the use of powder as a starting material is undesirable. This approach avoids powder-based processes, rather it combines two traditional fabrication technologies such as extrusion and welding in the microscale, and in a repeated stepwise sequence to progressively build structures.

Depositing small dimension of solid (30–200 micron) from liquid streams undergoing solidification, and simultaneously welding at various nodal locations of the solid by remelting of the immediately deposited solid creates the basic microporous object. Bulk solids can also be built up that contain open spaces within the microstructure. The deposited elements of solid are designed to have long or thin aspect ratio, to allow the formation of an open structure supported by microcolumns (e.g., wires or fiber) and walls (e.g., foils) at relatively low density, but avoiding spherical or particulate morphology of the solid sections which tends to be more dense. The present liquid metal casting approach is envisioned to keep the cost low and to make the process applicable to different materials.

The method utilizes an extrusion scheme of liquid or semisolid material through one or more orifices to make wires of fibers of those substances whose melting temperature is above the temperature outside of the extrusion die. To do this, liquid material is first placed in a container with one or more orifices which can be covered and pressurized in one or more ways. The temperature of the container is maintained above the liquidus temperature of the materials. Heating of the container is achieved by an induction coil or a furnace surrounding the container or by other means for heating. Then applying pressure to eject the liquid into the cooler environment where solidification can begin. Liquid or semisolid streams ejected from the orifice begin to undergo solidification to form wire (or fiber), and simultaneously and concurrently weld wires (or fiber) solidified in the previous instant. This simultaneous welding of predeposited wire is possible due to the sufficient sensible heat in the exiting liquid can remelt the small wire dimension solidified in a prior instant.

Another feature of the process is to follow the deposition process by intermittent hot working via heated punch and dies to impart both exterior and interior shape. Thus a macrostructure is built to produce the required shape in which the internal microstructure, its detailed features and channels, etc. are put in simultaneously. (This build up is similar in a way with natural processes in which growth and deposition is combined with erosion and displacement, as in coral reefs and many other structures). Hot worked structures have strong advantages in terms of mechanical properties over deposited or rapid prototype structures. They are significantly tougher.

The reservoir containing liquid metal is pressurized by an inert gas to eject liquid through the orifice, which drops under gravity. The cooler temperature of the environment may be maintained by either not heating this area or by blowing cooling gas (e.g., inert gas like argon if reaction or oxidation is to be avoided or between deposited layers by air if a thin oxide skin on the wire is desired.

The orifice diameter is controlled by the size of hypodermic needle or metal or ceramic wire, and a gas control valve can be used to turn liquid flow on or off. Extensive gas cooling can be applied to solidify liquid stream. When no forced cooling is employed, the solidification of the stream can be delayed until the head of the stream reaches a position well below the orifice depending on the orifice size, extrusion pressure and liquid and orifice temperature.

Immediately upon exit from the container the liquid stream starts to freeze. Below the liquid portion of the stream the stream becomes partially solid-liquid mixture since the outer skin of the stream freezes rapidly. Below this solid and liquid zone the-stream is replaced by solid wire. The solid-liquid zone is the wire "welding zone" as collection of material from this zone allows the stream's internal liquid portion to flow outward and mix remelt immediately deposited solid upon contact with it due to its high latent heat, to form an integral weld.

Movement of the substrate (or the location where deposit is building) between the 100% solid zone and the welding zone allows the deposited solid segments to be instantly welded at nodes to create a supportable network structure in three dimensions. This feature has been employed to develop unique concepts for building fibrous mats (or wire mats), fiber core (or foil core) solids and graded porosity solids. Solids can be produced by either building directly from a substrate or unattached to the substrate as a free material. Moreover, hollow objects can be filled by using the process by directly injecting metal fiber (or wire) mat into the object. With properly controlled movement of the deposition substrate, freeform fabricated shapes of complex geometry can be fabricated with near-zero to about 95% porosity.

Both macro- and microstructures can be created by the process. Four different aluminum alloys have been used to create these structures: A-356 aluminum (Al-8%Si), 7075 Al (Al-5.6%Zn—Mg—Cu—Cr), 5083 Al (Al-4.5%Mg-0.8%Mn), and 6061 Al (Al-1.0%Mg-0.28%Cu-0.6%Si). The formation and concurrent welding of wire segments appear to be equally easy with all of these products although 7075 Al forms a slightly more rounded nodal structure possibly indicating that its larger temperature range of solid liquid zone. The microstructural parameters of materials produced and their process conditions are shown in Tables I and II. As compared to existing metal foam or honeycomb structures, these materials are finer in their microstructures, with promise for improved mechanical properties. Due to the rapidly solidified wire microstructure, the wires themselves are also stronger. By depositing of the surfaces of shaped articles, e.g., a mold, porous mat structures of precise internal shapes can be produced.

Reinforcing fibers (such as of ceramic or metal) can be easily incorporated into the depositing materials as deposition is achieved. The lay direction of the deposited wires and fibers can be altered in three dimensions by suitable motion of the substrate. Bonding of porous mat to shaped substrate can be performed by bringing the substrate within the "welding zone" of the stream. This also requires preheating the substrate to a high temperature to allow welding with the substrate and also between the wires themselves. Gradient pore microstructure can be produced by altering the frequency of residence time of the substrate held between the welding zone and the 100% solid zone.

The method is adaptable to layered manufacturing operation and fabrication of shaped articles by freeform process. The cost advantages are realized from the adaptability of the process to automation and the avoidance of the requirement for metal powder which is often needed for such operations, and which is manufactured by another expensive step.

The method is capable of creating a completed porous or solid part. First, a precision mold of the part is created in two halves. Deposition is carried out into each of the mold halves until full. Thereafter, the two halves are joined by pressing into each other in a heated die allowing deformation/solid state bonding of the halves facilitated by their rough crushable surfaces.

Alternatively, the two halves can be first welded by the same liquid stream used for creating the halves followed by a final hot die pressing operation. The hot die employed here may be the same half molds used for creating the half parts. Hot pressing is carried out in a suitable press with such heated dies and molds. Such a porous part could be made prebonded to solid face (or skin) sheets if necessary, and would be considerably lighter than their solid counterpart. By grading porosity in such structures, it is possible to place greater mass density near the skin and less density near the core of the part, thereby producing stiff, ultralight structures.

Due to the limited flexibility for shaping articles during rapid deposition of liquid metal, a step of discontinuously shaping the deposited wire structure by periodic mechanical movement of the precision dies during the deposition process can be added. For the solidified metal structures this involves a hot deformation process and interrupting the deposition process momentarily when dies heated in the range of an appropriate metalworking temperature move in to impart the desired shape to the deposited porous metal. Besides imparting the shape, partial densification of the porous material also occurs which can provide a greater structural efficiency in the part. Thus by using this method, alternate deposition and shaping can be continued to develop both an internal microstructure and an external shape. Thus may a component have a variety of attributes arising from its designed and progressively built microstructure.

The deposition chamber or platform can be fitted with moving dies to achieve the hot deformation step. The dies have a certain exterior shape, and if desired also can have shaped penetration pinches to produce additional hole pattern into the freshly deposited metal. At specific time intervals during deposition, the substrate plate containing deposit is brought under or between the dies, and the dies are moved to press the deposit and punch hole pattern as required. Thus are created internal hole patterns.

An example of creating an internal hole pattern can be the creating of a hexagonal hole pattern with prismatic walls thus producing a honeycomb structure. The honeycomb structure can be made by periodic penetration of an array of hexagonal spear head punch tips into the porous deposit. Pushing of the wire element during penetration cause densification near the hole surfaces. Punch temperature is maintained above the alloys recrystallization temperature to allow best hot forming of the holes and structures without fracture. This densification and the proximity of fine holes creates a rigidizing effect in the porous deposit. The hexagonal holes can be made continuous through the material or interrupted in between by deposition of an extra layer of metal to produce cellular structure with porous walls. Such structures are efficient for load carrying ability.

Instead of hexagonal pattern of holes, if a dumbbell shaped staggered hole pattern is created by appropriate dumbbell shaped spear head punch array, thin zig zag ligaments joining each other can be made to meander through the material. Because these ligaments are connected with each other, extension of ligaments are strongly interdependent. Thus if thermal expansion of such a material is considered, utilizing inward reentrant ligament configuration, the expansion of ligaments can be directed internal to the structure with little change in the overall outer dimension of the material. Thus with suitable choice of the dumbbell pore shape, a solid with zero or low thermal expansion coefficient can be produced. The rigidizing effect again produces a rather stiff material with a specific functionality important for applications requiring dimensional stability, such as in navigational systems.

The dies and punches which produce internal microstructures mentioned above, can have other features of shape which control their internal dimensions. During periodic pressing, the outside shape can be imparted as well. Thus for example, an overall curved panel or an airfoil shape with internally rigidized lightweight porous structures with specific finctionalities can be produced.

As discussed above, the distance from the liquid metal source is varied to grade the density of the porous deposit. Thus closed face sheet structures with internal honeycombs or cooling passages, or preplaced sensors for internal load sensing or gas sensing, etc. can be produced. Preplaced cooling passages or the long and narrow internal meandering passages between the connected porosity are effective for active cooling, and heat exchangers can be built for use in combustors, and energy producing equipment. Due to the enormously large surface area offered by the porous wire mat structures, storage of hydrogen gas or other gases which may be used in energy production in large amounts would be possible by using these materials. It is conceivable to use titanium alloys or other gas absorbing metals for such application.

High stiffness and lighter weight structures can be prepared by proper distribution of the solidifying liquid into core structures that are not composed of random orientation of wires but directed in a specific geometric pattern. To describe such a pattern, it may recalled that spherical hollow geodesic domes made from truss segments connected in a triangular pattern along the spherical surface possess the highest stiffness-to-weight ratio. Similarly, wire deposition is carried out along the surfaces of a series of solid supporting spherical inserts (to be leached out after fabrication) such that the required porous structure is made up of wire-welded wall regions connected to each other with hollow spherical space inside, then a combination of high stiffness and lightweight is achieved. By changing the ratio of the hollow space to the wall thickness, the density, stiffness, and strength of the structure can be controlled. Furthermore, if anistropic strength or stiffness properties are desired, the removable supporting solid inserts could be made into ellipsoidal or rectangular shaped pieces, which provide higher strength and stiffness in the direction of elongation of the hollow cells.

Inexpensive insert material can be used, which may be removable from the porous substance by an impacting and flowing jet of gas or water through it and/or by introducing light vibration. Another characteristic was the relative chemical inertness toward liquid metal. A material that was selected was a mixture of common clay with silica sand, 50–80 micron particle diameter. Spherical balls (3–6 mm dia.) were prepared from this mixtures and dried. At suitable intervals during wire deposition, the deposition process was momentarily interrupted to lay a prearranged array of balls on the deposit, and random wire deposition resumed. The liquid wires weld to the base wire structure and lay over the surfaces of the balls in a random weblike pattern and solidify. The process is repeated until a porous structure of desired height and external shape is produced.

Apart from these hollow spherical and ellipsoidal cell structures, triangular inserts and elongated sinewave inserts with wavy walls or eggcrate insert geometries can also be used to enhance structural stiffness. These shapes also provide open passages along a certain direction to permit fluid flow through the porous metal during service. Such structures can be suitable for multifunctional structural applications involving thermal management, etc.

The ability to incorporate high toughness and internal details in the progressively built-up structure together with preplaced details in selected locations can provide many opportunities for applications involving multiple functions. For example, in heat exchanger and support structures for electronics, fuel cells, combustor for future turbine and rocket engines, battery for space vehicles as well as earth based clean secondary power generation applications, actuators, porous structures for blast protection for bomb squad, sound absorption in buildings and bridges and many others. While these applications are current targets as dictated by the funding source, many consumer applications in electronic, power generation, automotive, biomedical industry are obvious. It is expected that this technology will combine with MEMS and other sensor technology applications.

For a more complete understanding of the present invention, reference is made to the following detailed description when read in conjunction with the accompanying drawings wherein like reference characters refer to like elements throughout the several views, in which:

BRIEF DESCRIPTION OF THE DRAWINGS

FIGS. 2B1 and 2B2 illustrate macro and micro structures of the A356 alloy porous wire welded material;

FIGS. 3B1 and 3B2 illustrate SEM micrographs of a structure exhibiting open cells and wire welded wall structures for a 7075 aluminum alloy;

DESCRIPTION OF THE PREFERRED EMBODIMENTS

Figure 1:
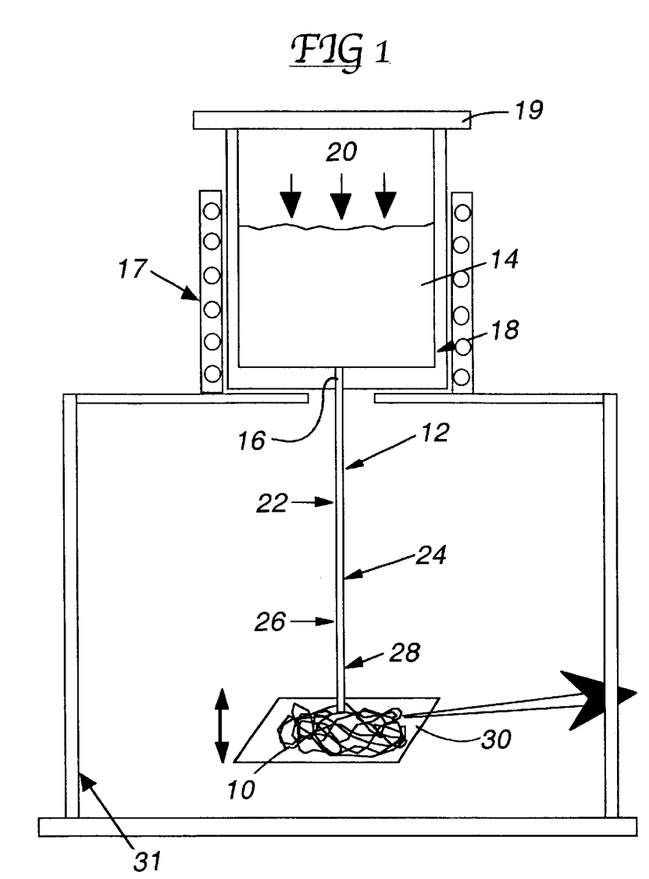
FIG. 1 illustrates the basic features of the concurrent wire deposition/welding process to build a wire (fiber) cellular network porous alloy by liquid extrusion and in-situ welding.
Figure 1A:
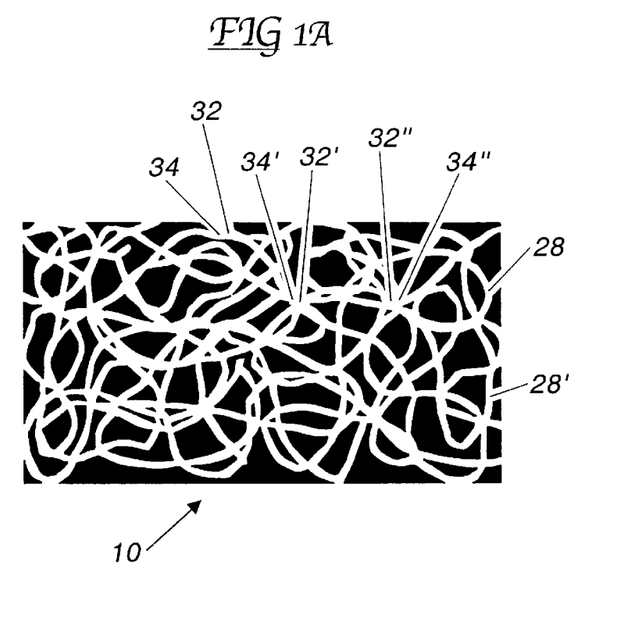
FIG. 1A illustrates an enlarged view of a wire mat created by the method of the invention.
Figure 2:
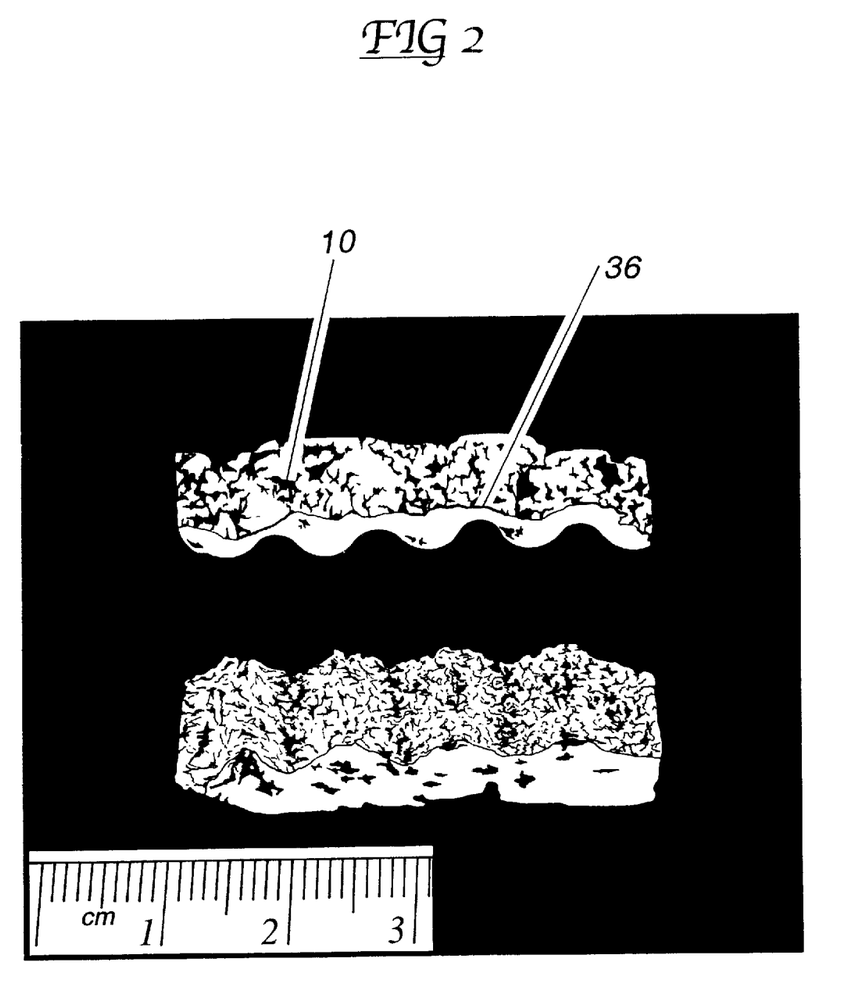
FIG. 2 illustrates porous wire network products for an aluminum A-356 alloy created by the method of the invention.

Now turning to FIG. 1, the method and device for creating welded wire mat 10 is shown. The wire mat 10 is created from liquid stream 12 of material 14 forced through orifice 16 from melting device 18. Means for heating 17, such as an induction coil or a furnace (not shown) surround the melting device 18 to provide the temperature increase to melt the material. The melting device 18 can be covered by a cover 19 to achieve pressurization by gas 20. Gas 20 creates pressure to force material 14 through orifice 16. Liquid stream 12 exits from melting device 18 through orifice 16 and starts solidification 22, then liquid stream 12 enters a semisolid phase or the welding zone 24 and thereafter enters the finish of the solidification 26 and becomes a solid wire or fiber 28 and is deposited onto a movable and rotatable substrate 30. The substrate must be moved upward repeatedly into the semisolid or liquid range to permit welding of the deposited solid wire simultaneously to create the porous network FIG. 2A depicts sine wave parts for an aluminum A-356 Alloy porous wire mat 10. Face sheet 36 is employed with upper mat 10.

Figure 2B:
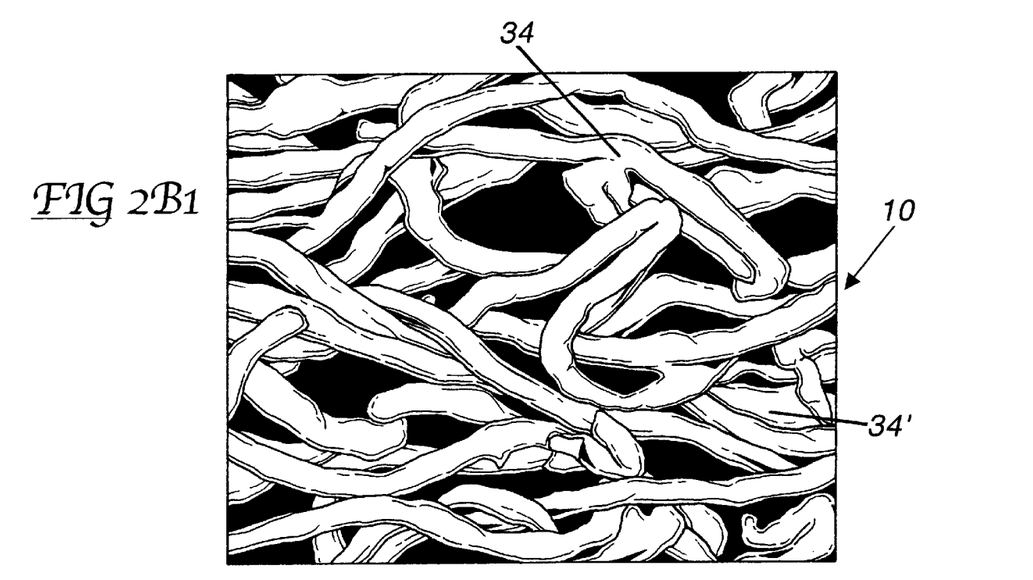
Figure 2B:
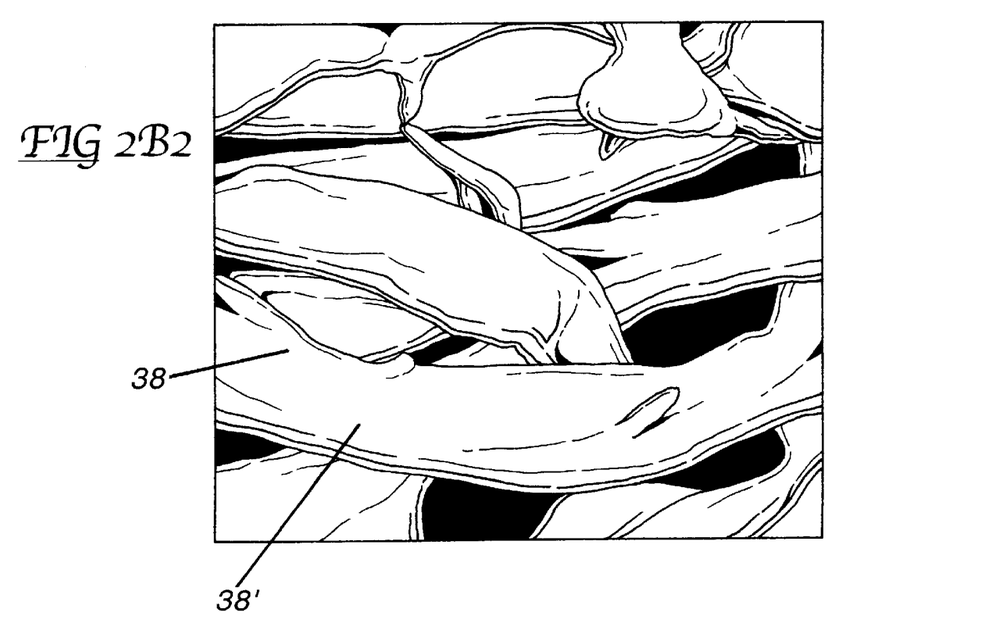

FIGS. 2B1 and 2B2 depict macro and micro structures of A356 alloy. Weld nodes 34, 34' are shown on the upper view of mat 10, (FIG. 2B1) while interlocking branches 38, 38', etc. are shown on the lower view of mat 10 (FIG. 2B2).

Figure 3:
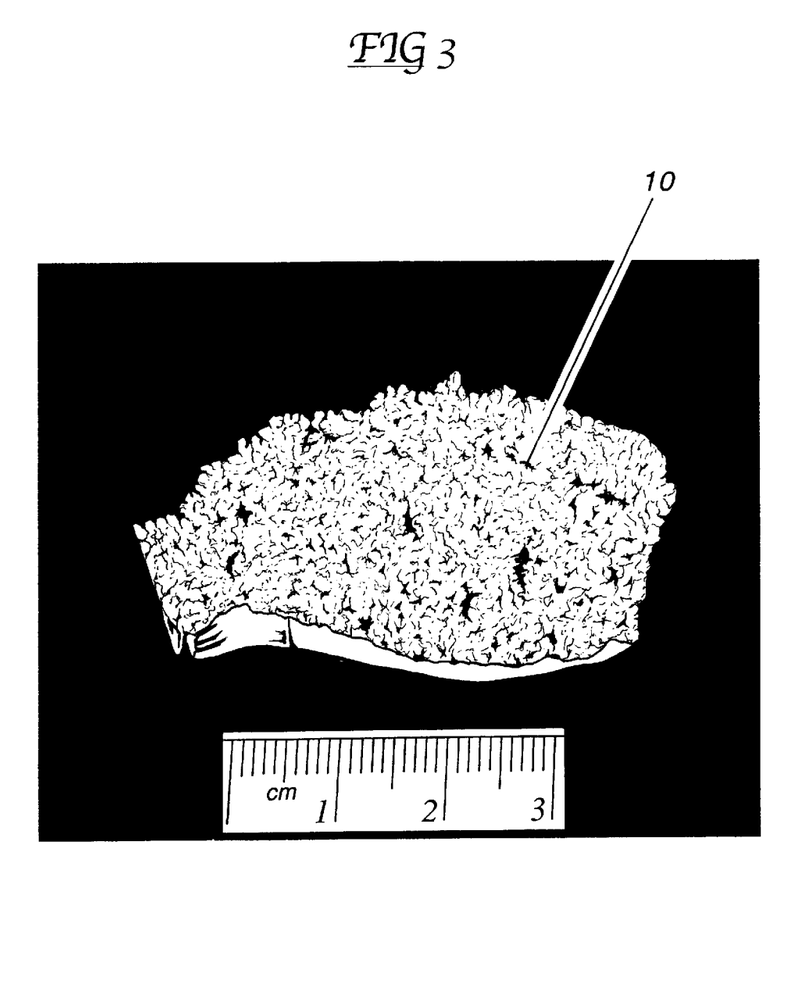
FIG. 3 illustrates a porous wire mat of 7075 Aluminum.
Figure 3B:
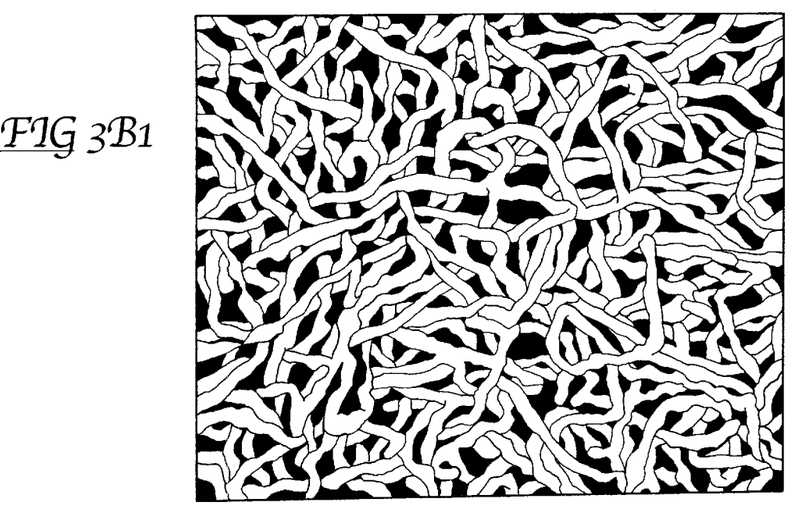
Figure 3B:
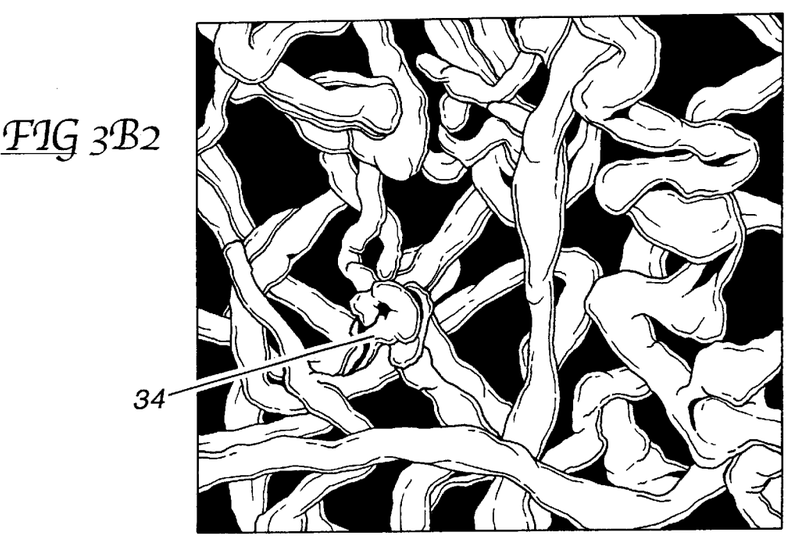

Porous wire mat of 7075 Aluminum is shown in FIG. 3. FIGS. 3B1 and 3B2 depict structures of the A7075 Al alloy. Weld node 34 is shown on the lower view of mat 10 (FIG. 3B2).

Figure 4:
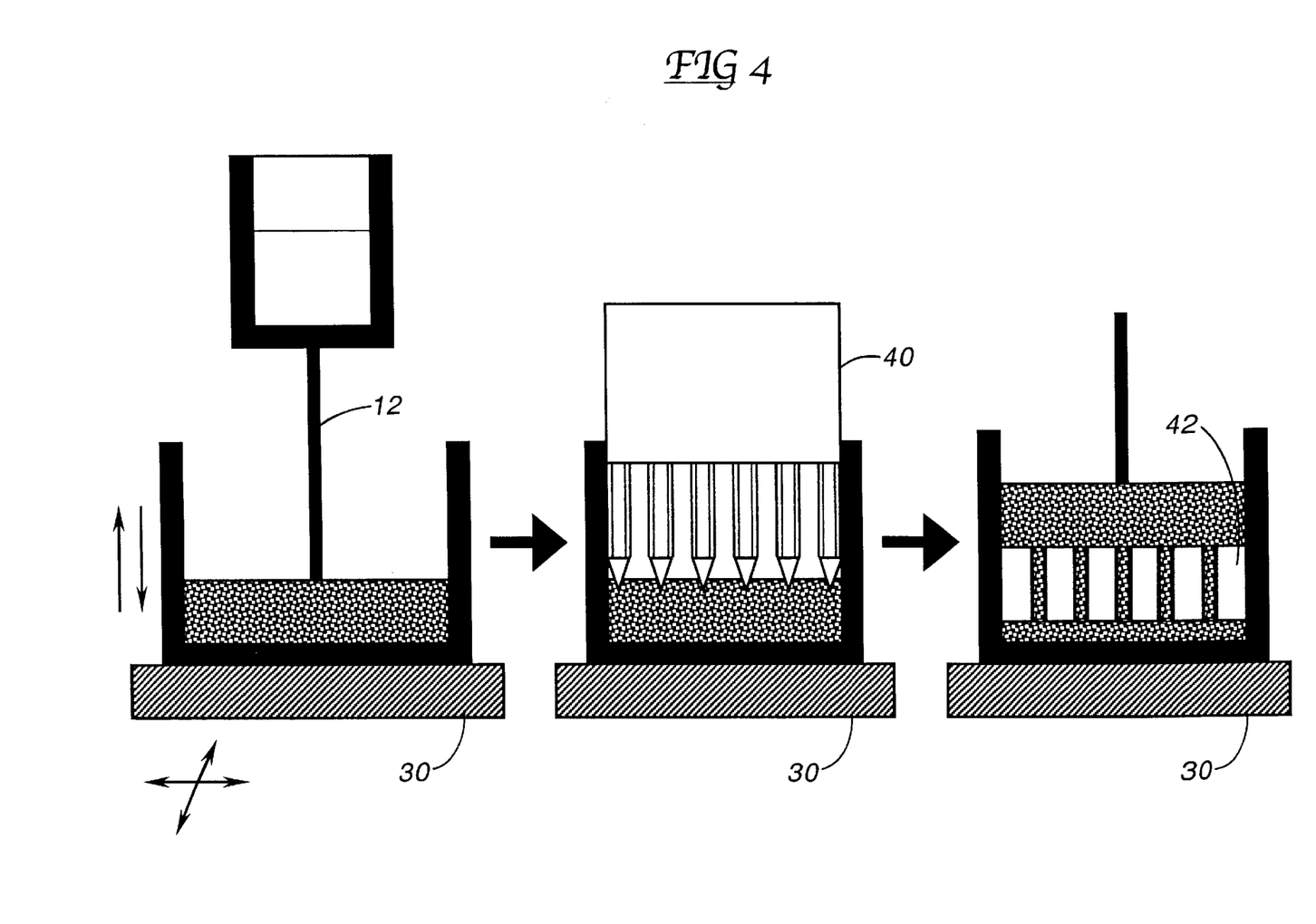
FIG. 4 illustrates deposition steps for creation of internal channels in the porous mat with the use of movable dies.

The step of deposition of the liquid stream 12 or extrusion onto the movable, rotatable platform is followed by shaping the deposit or mat 10 with a punch 40. Punching the deposit or mat 10 creates internal shapes 42 in the deposit. Thereafter another deposition step is applied over the internally shaped material 40. (FIG. 4)

Figures 5, 6, 7:
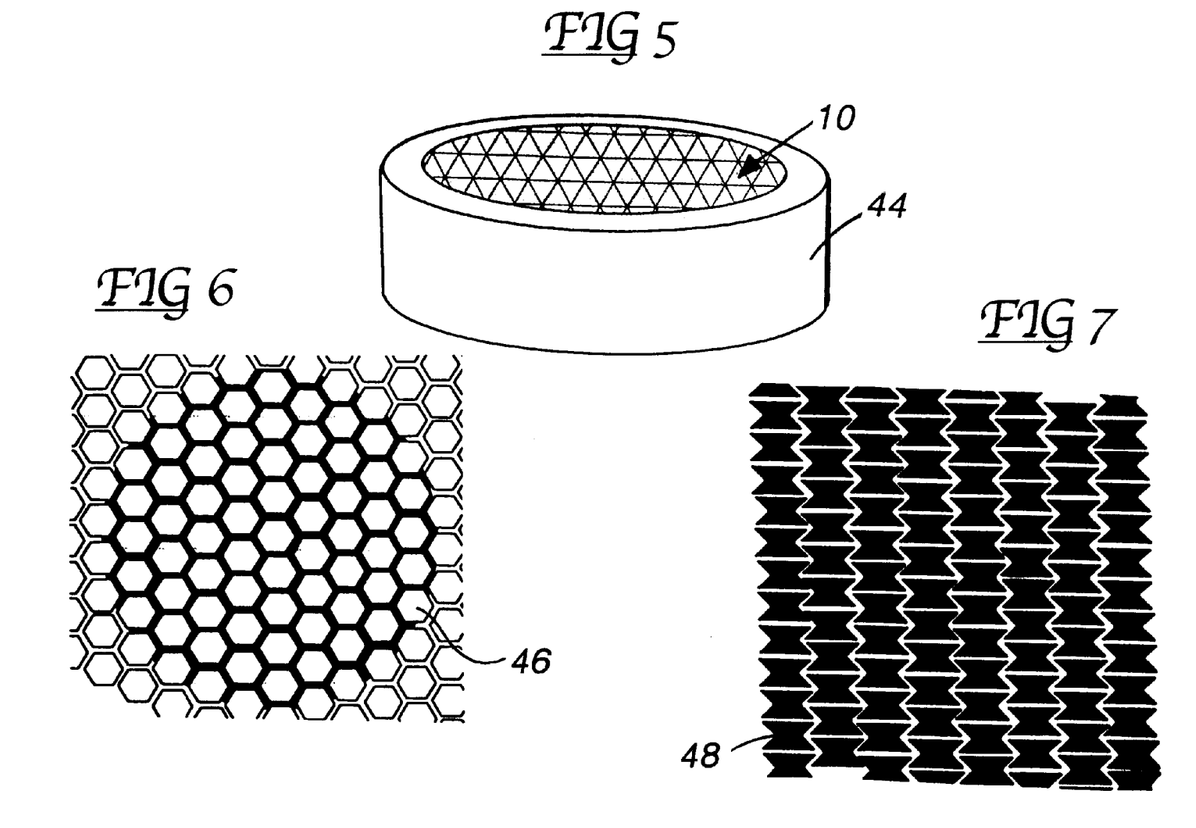
FIG. 5 illustrates a solid outer with a porous core.
FIG. 6 illustrates a hexagonal prismatic wall.
FIG. 7 illustrate a hole pattern of a deposited porous solid with embedded channels.

An object with solid outer dimension is 44 depicted in FIG. 5. Hexagonal prismatic wall 46 for structural soundness creates a honeycomb structure as depicted in FIG. 6. Hole pattern (48 shown dark) produces a solid with zero CTE. FIG. 7.

Figure 8:
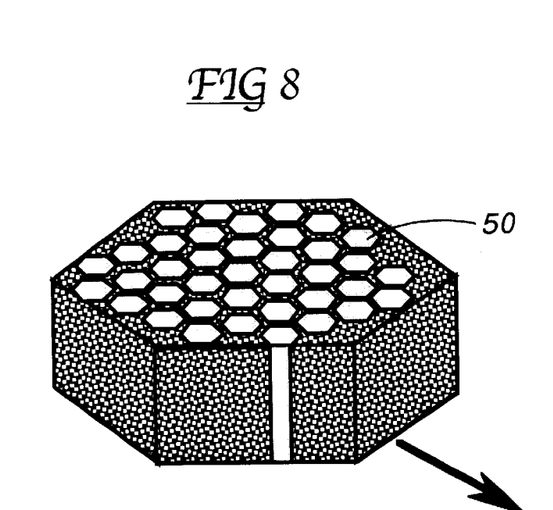
FIG. 8 illustrates a sketch example of a deposited porous solid with embedded channels.
Figure 8A:
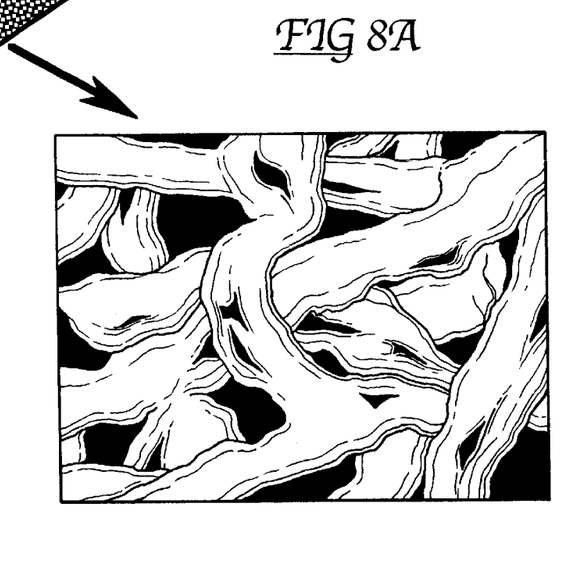
FIG. 8A illustrates a SEM micrograph of the internal structure of the deposited solid of FIG. 8.
Figure 9:
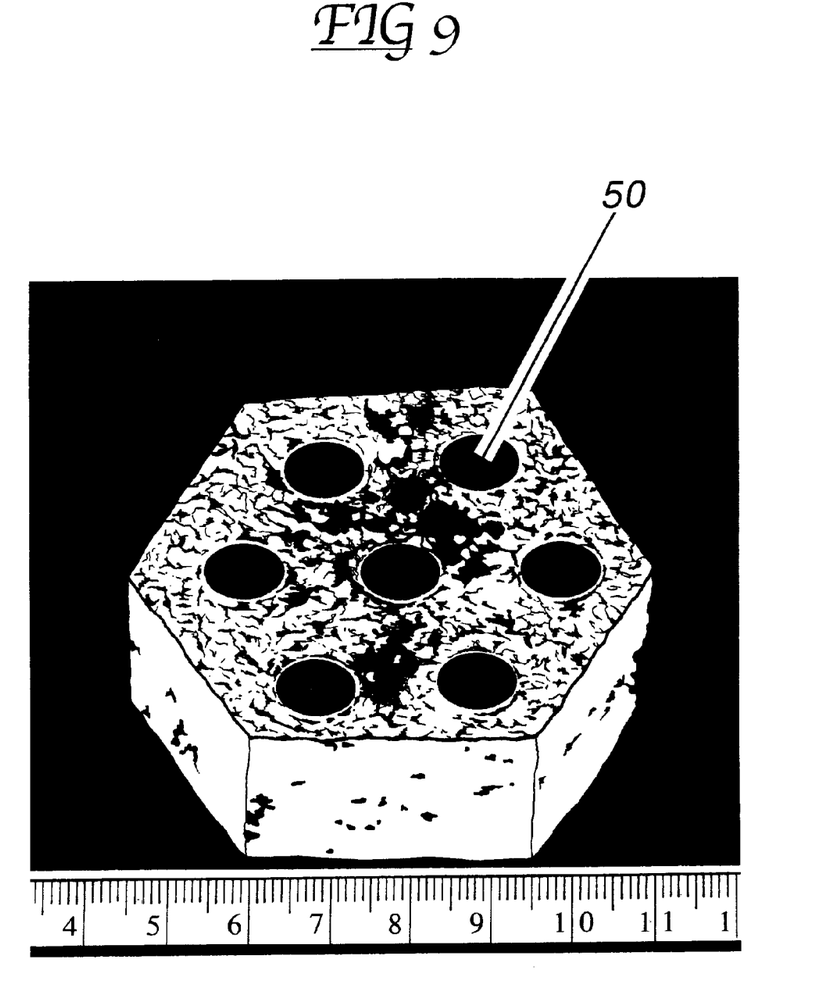
FIG. 9 illustrates a photograph of a deposited porous solid with embedded hollow channels.

An example of deposit with hexagonal embedded hollow channels 50 is shown in FIG. 8. The internal structure of the deposit of FIG. 8 is shown in FIG. 8A. A photograph of deposited porous solid with embedded hollow cooling channels is shown in FIG.9.

Figure 10:
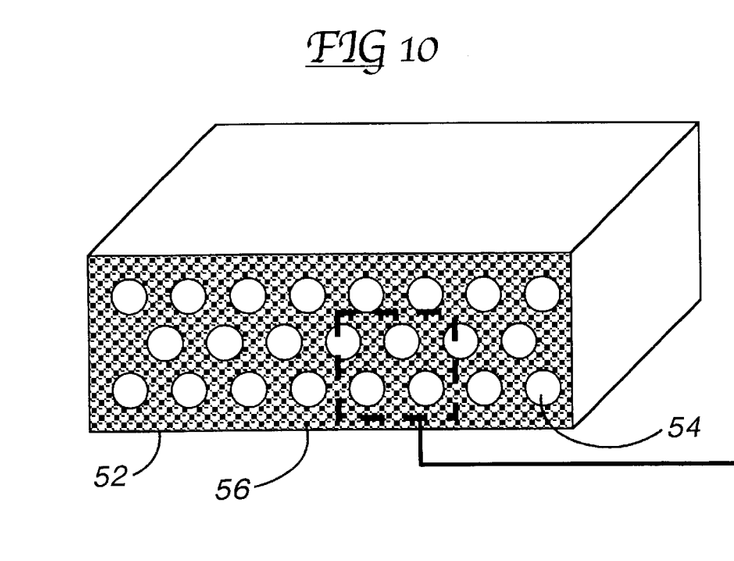
FIG. 10 illustrates hollow sphere reinforced open cell porous metal structure with wire frame hollow spheres surrounded by wire welded matrix walls.
Figure 10A:
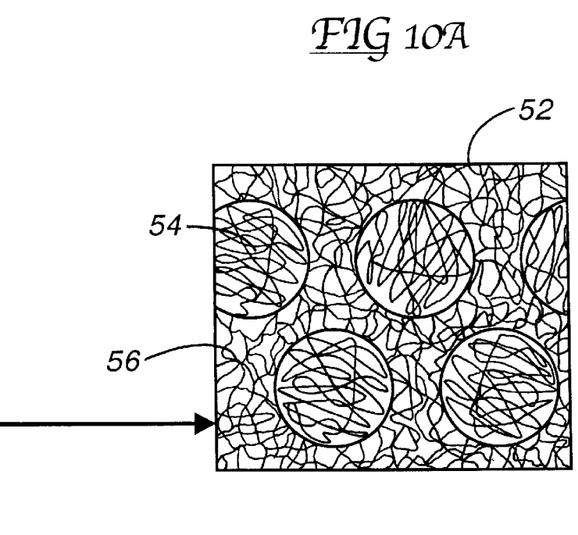
FIG. 10A illustrates the internal microstructure of the hollow sphere reinforced open cell porous metal structure with wire frame hollow spheres surrounded by wire welded matrix walls of FIG. 10.

Hollow sphere reinforced open cell porous metal structure 52 having frame hollow spheres 54 surrounded by wire welded matrix walls 56 is depicted in FIG. 10. The internal microstructure of the hollow sphere reinforced open cell porous metal structure 52 is depicted in FIG. 10A.

Figure 11:
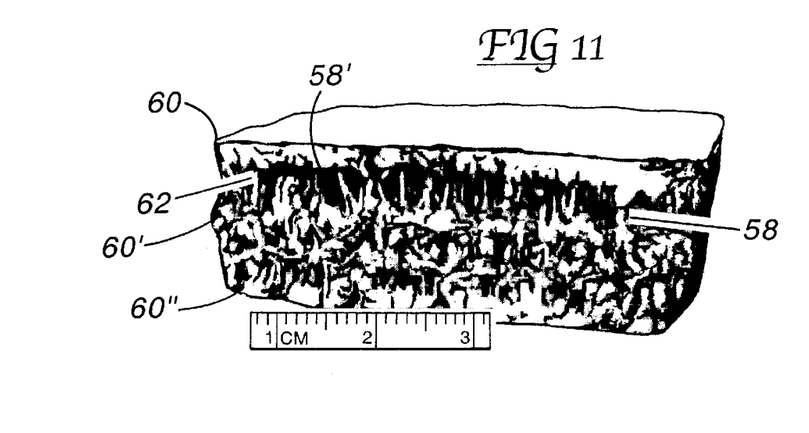
FIG. 11 illustrates a deposited porous solid having microcolumns.

A deposited porous solid having microcolumns 58, 58', etc. created between screening layers 60, 60', 60", etc. is depicted in FIG. 11. Spacers 62 are used to set the distance between the screening layers 60, 60', 60", etc. As the porous solid is deposited microcolumns 58, 58', etc. are formed. The screening layers can be planar or shaped such as in a curvilinear shape or other desired shape.

Having described the invention, many modifications thereto will become apparent to those skilled in the art to which it pertains without deviation from the spirit of the invention of simultaneous deposition and concurrent welding of the network structure as defined in the appended claims.

What is claimed is:

1. A method for producing a microporous object having one of a fiber, wire and foil core comprising the following steps:

concurrently depositing small dimensions of solid from ejected liquid streams through a liquid zone undergoing solidification onto a substrate, the small dimensions of solid having at least one of a long and a thin ratio; and simultaneously in-situ welding of certain nodes of the depositing solid by movement of the substrate into the liquid zone, thereby creating porous bulk materials having cellular microstructure and containing open spaces within the cellular microstructure.

2. The method for producing a microporous object according to claim 1 further comprising the following step:

heating the solid in a container to a temperature between the solidus and the liquidus temperature of the material.

3. The method for producing a microporous object according to claim 1 further comprising the following step:

heating the solid in a container to a temperature above the liquidus temperature of the material.

4. The method for producing a microporous object according to claim 2 further comprising the following step:

pressurizing the container for controlling extrusion of the solid from the container.

5. The method for producing a microporous object according to claim 2 further comprising the following step:

means for cooling the liquid stream prior to the liquid stream being welded by newly arriving metal.

6. The method for producing a microporous object according to claim 5 wherein the means for cooling comprises forced cooling.

7. A method for producing a microporous object having one of a fiber, wire and foil core comprising the following steps:

depositing small dimensions of solid from ejected liquid streams through a liquid zone undergoing solidification onto a substrate;

concurrently creating a porous cellular network by periodic welding of certain nodes of the solid by movement of the substrate into the liquid zone, thereby creating bulk materials having cellular microstructure and containing open spaces within the cellular microstructure; and inserting inserts into the liquid stream undergoing solidification to produce hollow internal geometric shapes.

8. The method for producing a microporous object according to claim 7 wherein the inserts have a spherical configuration.

9. The method for producing a microporous object according to claim 7 wherein the inserts have a triangular configuration.

10. The method for producing a microporous object according to claim 9 further comprising the step of punching at least one hole in one of the fiber core and the foil core.

11. The method for producing a microporous object according to claim 10 further comprising at least one hexagonal spear punch.

12. The method for producing a microporous object according to claim 1 further comprising the steps of depositing material into more than one die segment; and compressing the more than one die segment together to build a larger block of porous solid.

13. A microporous object having an open structure created by the method according to claim 1.

14. A method for producing a microporous object having one of a fiber, wire and foil core comprising the following steps:

depositing small dimensions of solid from ejected liquid streams through a liquid zone undergoing solidification onto a substrate;

concurrently creating a porous cellular network by periodic welding of nodes of the solid by movement of the substrate into the liquid zone, thereby creating bulk materials having cellular microstructure and containing open spaces within the cellular microstructure; and forming microcolumns in the microporous object.

15. The method for producing a microporous object according to claim 14 further comprising the steps of placing screening and spacers for channeling the liquid streams therebetween screening to form microcolumns welded between screening, and filling surface of screening to create one of partial sheets and complete sheets.

16. The method for producing a microporous object according to claim 15 wherein the screening being curvilinear.

17. The method for producing a microporous object according to claim 7 wherein the inserts are removable to create hollow internal geometric shapes.

18. The method for producing a microporous object according to claim 10 further comprising the step of punching at least one hole into the deposited network structure while the structure is still in a soft state near the solidus (high) temperature.

* * * * *